(12) United States Patent
Oguma et al.

(10) Patent No.: US 9,447,479 B2
(45) Date of Patent: Sep. 20, 2016

(54) METHOD OF TREATING RECYCLABLE RAW MATERIALS

(71) Applicant: MITSUBISHI MATERIALS CORPORATION, Tokyo (JP)

(72) Inventors: Nobuhiro Oguma, Kagawa-gun (JP); Fumito Tanaka, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 73 days.

(21) Appl. No.: 14/359,751

(22) PCT Filed: Oct. 10, 2013

(86) PCT No.: PCT/JP2013/077577
§ 371 (c)(1),
(2) Date: May 21, 2014

(87) PCT Pub. No.: WO2014/203412
PCT Pub. Date: Dec. 24, 2014

(65) Prior Publication Data
US 2015/0337409 A1    Nov. 26, 2015

(30) Foreign Application Priority Data

Jun. 21, 2013   (JP) ................................ 2013-130943

(51) Int. Cl.
*C22B 7/00*   (2006.01)
*B09B 3/00*   (2006.01)
(Continued)

(52) U.S. Cl.
CPC . *C22B 7/00* (2013.01); *B09B 3/00* (2013.01); *B09B 3/0083* (2013.01); *C22B 1/00* (2013.01);
(Continued)

(58) Field of Classification Search
CPC ....... C22B 7/001; C22B 11/025; F23G 5/20; F27B 7/28; B09B 3/0083
See application file for complete search history.

(56) References Cited

U.S. PATENT DOCUMENTS 5,301,621 A    4/1994  Vassiliou et al.
5,843,204 A *  12/1998 Ishikawa ................... C22B 7/02
                                              266/145

(Continued)

FOREIGN PATENT DOCUMENTS

CN    101255500 A    2/2011
CN    102471827 A    5/2012

(Continued)

OTHER PUBLICATIONS

Notice of Allowance mailed Jan. 19, 2015, issued for the Korean patent application No. 10-2014-7016315 and English translation thereof.

(Continued)

*Primary Examiner* — George Wyszomierski
*Assistant Examiner* — Tima M McGuthry Banks
(74) *Attorney, Agent, or Firm* — Locke Lord LLP; James E. Armstrong, IV; Nicholas J. DiCeglie, Jr.

(57) ABSTRACT

A method of treating recyclable raw materials containing valuable metals is provided, the method including the steps of feeding recyclable raw materials (W) containing valuable metals into a rotary kiln furnace (2) in which a refractory product having an $Al_2O_3$—$Cr_2O_3$ content of 70% or greater is used for an inner wall; feeding an additive (A) containing $SiO_2$ as a major component into the rotary kiln furnace (2) so as to increase a viscosity of a slag (S) flowing along the inner wall, thereby the recyclable raw materials (W) are attached on the slag (S) having a high viscosity such that at least part of the recyclable raw materials (W) is exposed to the inside of the rotary kiln furnace; and burning/melting the recyclable raw materials (W) attached on the slag (S) in the rotary kiln furnace (2).

2 Claims, 1 Drawing Sheet

(51) Int. Cl.
| | |
|---|---|
| C22B 1/00 | (2006.01) |
| C22B 11/00 | (2006.01) |
| C22B 15/00 | (2006.01) |
| C22B 11/02 | (2006.01) |
| F23G 5/20 | (2006.01) |
| F23G 5/02 | (2006.01) |
| F23G 5/16 | (2006.01) |
| F27B 7/20 | (2006.01) |

(52) U.S. Cl.
CPC ............... *C22B 7/001* (2013.01); *C22B 11/00* (2013.01); *C22B 11/025* (2013.01); *C22B 15/0002* (2013.01); *F23G 5/02* (2013.01); *F23G 5/16* (2013.01); *F23G 5/20* (2013.01); *F27B 7/20* (2013.01); *F23G 2201/701* (2013.01); *Y02P 10/214* (2015.11); *Y02P 10/23* (2015.11)

(56) References Cited

U.S. PATENT DOCUMENTS

| | | | |
|---|---|---|---|
| 6,352,951 B1* | 3/2002 | Mossal | C04B 35/106 501/105 |
| 7,951,222 B2* | 5/2011 | Armabessaire | C22B 7/003 75/401 |

FOREIGN PATENT DOCUMENTS

| | | |
|---|---|---|
| JP | 11-351757 A | 12/1999 |
| JP | 2001-096252 A | 4/2001 |
| JP | 2001-133158 A | 5/2001 |
| JP | 2001-152217 A | 6/2001 |
| JP | 2001-316172 A | 11/2001 |
| JP | 2001-324278 A | 11/2001 |
| JP | 2005-126732 A | 5/2005 |
| JP | 2008-070040 A | 3/2008 |
| JP | 2008-139009 A | 6/2008 |
| JP | 2009-063286 A | 3/2009 |
| JP | 2009-222288 A | 10/2009 |
| JP | 2009-233494 A | 10/2009 |
| JP | 2012-172175 A | 9/2012 |
| JP | 2012-224877 A | 11/2012 |
| TW | 200918674 A | 5/2009 |
| WO | WO-2012/140951 A1 | 10/2012 |

OTHER PUBLICATIONS

Office Action mailed Jan. 26, 2015, issued for the Taiwanese patent application No. 102137317 and English translation of a part of Search Report.

Notice of Allowance mailed Sep. 2, 2014, issued for the Japanese patent application No. 2013-130943 and English translation thereof.

Takehiko Hirata et al., "Improvement of the corrosion resistance of alumina-chromia ceramic materials in molten slag", Journal of the European Ceramic Society, vol. 23, No. 12, Nov. 1, 2003, pp. 2089-2096.

Supplementary European Search Report dated Apr. 29, 2015, issued for the European patent application No. 13854204.8.

Office Action dated May 18, 2015, issued for the Chinese patent application No. 201380003692.9 and English translation of the Search Report.

International Search Report dated Nov. 19, 2013, issued for PCT/JP2013/077577 and English translation thereof.

Office Action dated Apr. 8, 2014, issued for the Japanese patent application No. 2013-130943 and English translation thereof.

* cited by examiner

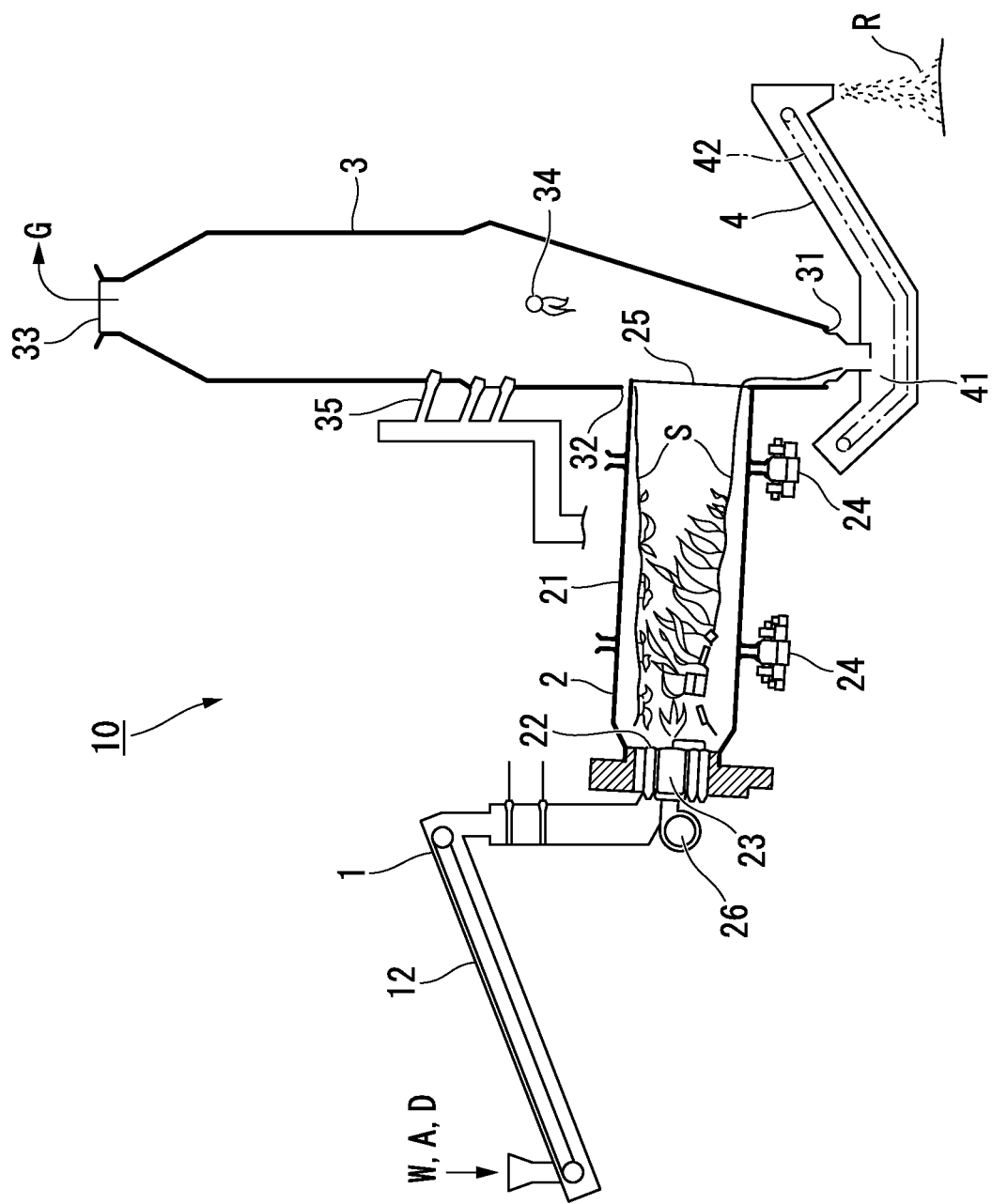

ion No. 2013-130943, filed Jun. 21, 2013, the content of which is incorporated herein by reference.

METHOD OF TREATING RECYCLABLE RAW MATERIALS

TECHNICAL FIELD

The present invention relates to a method of treating recyclable raw materials in which raw materials such as waste electronic components or waste electronic substrates containing valuable metals (for example, Cu, Au, Ag, Pt, or Pd) are burned/melted using a rotary kiln furnace to recover the valuable metals.

Priority is claimed on Japanese Patent Application No. 2013-130943, filed Jun. 21, 2013, the content of which is incorporated herein by reference.

BACKGROUND ART

Waste materials from electronic devices such as electronic substrates, flexible substrates, IC chips, mobile phones, or PCs, electrical appliances such as refrigerators, and automobiles contain combustible resin materials, iron (Fe), aluminum (Al), and other valuable metals such as copper (Cu), gold (Au), silver (Ag), platinum (Pt), and palladium (Pd). Therefore, techniques to reuse such waste materials as recyclable raw materials have been proposed.

Specifically, for example, the above-described waste materials are burned/melted ("burn/melt" in this specification refers to "burn and/or melt") in a rotary kiln furnace to obtain a slag, and the slag discharged from the rotary kiln furnace is granulated to obtain a granulated lump. In the subsequent processes, this granulated lump is charged into a copper smelting furnace or the like and is smelted to recover the above-described valuable metals.

In the related art, techniques disclosed in PTLs 1 to 3 below are known as methods of treating recyclable raw materials in which raw materials containing valuable metals are charged into a rotary kiln furnace to be burned/melted.

In PTL 1, a basicity (weight ratio $CaO/SiO_2$) of a slag (molten material) melted in a rotary kiln furnace is adjusted (the viscosity of the slag is decreased) by addition of a slag-melting agent containing CaO to increase the fluidity of the slag. As a result, due to a difference in specific gravity, molten metals are separated and discharged from the slag. In addition, considering corrosion resistance to the slag having such a high basicity, a brick (refractory product) which is composed of a basic magnesia-based refractory material containing MgO as a major component is used for an inner wall of a rotary kiln furnace.

In PTL 2, a water-containing sludge is added to waste materials (recyclable raw materials) containing metals charged into a rotary kiln furnace. As a result, the waste materials are gradually burned in the furnace to expand a burning zone in the furnace and to suppress a local temperature increase such that deterioration of a refractory product layer is prevented.

In PTL 3, an internal temperature of a rotary kiln furnace, which should be typically about 1400° C., is held at a low temperature of 600° C. to 700° C. to prevent the durability of the rotary kiln furnace from deteriorating due to overheating. Further, a stoker furnace is continuously provided on a downstream side of the rotary kiln furnace such that combustible materials are burned in two stages.

In addition, as disclosed in PTLs 1 to 3, typically, a burner for burning/melting recyclable raw materials and the like is provided inside a rotary kiln furnace.

CITATION LIST

Patent Literature

[PTL 1] Japanese Unexamined Patent Application, First Publication No. 2001-096252
[PTL 2] Japanese Unexamined Patent Application, First Publication No. 2009-063286
[PTL 3] Japanese Unexamined Patent Application, First Publication No. 2009-222288

SUMMARY OF INVENTION

Technical Problem

However, the above-described methods of treating recyclable raw materials in the related art have the following problems.

In the method disclosed in PTL 1, the brick (refractory product) is likely to be damaged (worn) by vigorously flowing slag. In addition, since the fluidity of the slag is high, all the recyclable raw materials charged into the rotary kiln furnace may be wetted by the slag or may be dipped into the slag. As a result, contact between the recyclable raw materials and combustion air is inhibited, and the combustion of the recyclable raw materials may be unstable.

Specifically, the recyclable raw materials and solidified slag therearound may be discharged outside the furnace without being sufficiently burned/melted, or may abruptly burst into flames while flowing through the inside of the furnace to rapidly change the internal furnace temperature, which may affect the treatment efficiency.

In addition, since the hardness is low, the refractory product such as the brick which is composed of a basic magnesia-based refractory material containing MgO as a major component is likely to be worn by being rubbed with non-melted solid recyclable raw materials flowing through the inside of the furnace or with solidified slag. As a result, this refractory product is not suitable for the treatment of recyclable raw materials such as waste substrates.

In addition, in the method disclosed in PTL 2, the brick (refractory product) which is composed of a basic magnesia-based refractory material containing MgO as a major component may be embrittled (slaked) by moisture and thus may be easily worn.

In addition, in the method disclosed in PTL 3, since the shapes of the recyclable raw materials before and after the treatment are not substantially changed, it is necessary that the shapes be adjusted by, for example, crushing the slag using a crusher or the like in the previous treatment or the subsequent treatment. As a result, the treatment cost (crushing cost) is high.

In addition, as disclosed in PTLs 1 to 3, in the methods in which a burner is provided inside a rotary kiln furnace such that the burner is ignited to heat recyclable raw materials and the like to be burned/melted during the treatment of the recyclable raw materials, the brick (refractory product) may be locally heated and damaged by burning flames of the burner. In addition, the fuel cost (running cost) of heavy fuel oil, gas, or the like for igniting the burner is high.

The present invention has been made in consideration of the above-described circumstances, and an object thereof is to provide a method of treating recyclable raw materials capable of the following: stably burning/melting recyclable raw materials, which are charged into a rotary kiln furnace, to stably maintain the treatment efficiency; suppressing the embrittlement and the wearing of a refractory product, which is used for an inner wall of a rotary kiln furnace, to increase durability; and burning/melting recyclable raw materials without igniting a burner in a rotary kiln furnace during normal operation other than an intra-furnace heating process (operation preparing process) to reduce the operation cost.

Solution to Problem

According to an aspect of the present invention, a method of treating recyclable raw materials containing valuable metals is provided, the method including the steps of: feeding recyclable raw materials containing valuable metals into a rotary kiln furnace in which a refractory product having an $Al_2O_3$—$Cr_2O_3$ content of 70% or greater is used for an inner wall; feeding an additive containing $SiO_2$ as a major component into the rotary kiln furnace so as to increase a viscosity of a slag flowing along the inner wall, thereby the recyclable raw materials are attached on the slag having a high viscosity such that at least part of the recyclable raw materials is exposed to the inside of the rotary kiln furnace; and burning/melting the recyclable raw materials attached on the slag in the rotary kiln furnace.

In the method of treating recyclable raw materials according to the present invention, the additive containing $SiO_2$ as a major component (specifically, for example, silica sand, silica, or casting sand containing $SiO_2$ as a major component) is charged into the rotary kiln furnace to increase the viscosity of the slag flowing along the inner wall of the rotary kiln furnace. Therefore, when the recyclable raw materials charged into the rotary kiln furnace come into contact with the high-viscosity slag, the recyclable raw materials are attached on the slag in which at least a part thereof is exposed to the inside of the rotary kiln furnace. As a result, the recyclable raw materials are reliably brought into contact with combustion air and thus are stably burned and melted.

In addition, the recyclable raw materials are burned and melted while being attached on the slag flowing along the inner wall of the furnace. Then, along with rotation of the rotary kiln furnace, the recyclable raw materials, for example, spirally flows to a downstream side in an axis direction while rotating around the axis of the rotary kiln furnace. Therefore, a temperature distribution in the rotary kiln furnace is likely to be uniform.

Accordingly, the treatment efficiency of the recyclable raw materials can be stably maintained at a high level. In addition, the recyclable raw materials are likely to be reliably melted. Therefore, unlike the related art, unnecessary processes and cost can be reduced, for example, it is not necessary that a slag which is discharged outside the furnace in a state containing non-melted residues (solid components) be crushed using a crusher or the like in the subsequent process.

Further, a silicate component used as the additive is used as an auxiliary raw material in the subsequent process, for example in a smelting process in which the slag treated in and discharged from the rotary kiln furnace is charged into a copper smelting furnace to recover valuable metals. Accordingly, when such a subsequent process is provided, a treatment process of removing the silicate component from the slag is unnecessary.

In addition, in the rotary kiln furnace, since the recyclable raw materials attached on the slag stably flow while being burned, recyclable raw materials newly charged into the furnace are easily ignited. As a result, during normal operation (during the treatment of recyclable raw materials) other than an intra-furnace heating process (operation preparing process), unlike the related art, it is not necessary that a burner be ignited in the rotary kiln furnace. Therefore, burning flames in the furnace can be stably maintained, and the recyclable raw materials can be continuously burned/melted. That is, according to the present invention, a refractory product such as a brick can be prevented from being locally worn by the heating of a burner, and the fuel cost can be reduced.

In addition, for the inner wall of the rotary kiln furnace, a refractory product such as an $Al_2O_3$—$Cr_2O_3$-based (alumina-chromia-based) brick is used instead of a basic magnesia-based refractory material. Therefore, the refractory product can be prevented from being embrittled by an effect of moisture in the furnace or the like. In addition, by controlling the content of $Al_2O_3$—$Cr_2O_3$ to be 70% or higher, resistance to $SiO_2$ can be secured. In addition, since the hardness is high, the $Al_2O_3$—$Cr_2O_3$-based refractory product is not easily worn even when being rubbed with non-melted solid recyclable raw materials flowing through the inside of the furnace or with condensates of the slag, and thus durability is sufficiently secured. As the refractory product used for the inner wall of the rotary kiln furnace, in addition to the above-described brick, for example, a caster or a precast block can be used.

According to the present invention, with the above-described configurations, the control of properties of the slag, the adjustment of a burning state in the furnace, and the wear prevention of the refractory product can be realized with simple equipment and method.

That is, the recyclable raw materials, which are charged into the rotary kiln furnace, can be stably burned/melted, and thus the treatment efficiency can be stably maintained. In addition, the embrittlement and the wearing of the refractory product, which is used for the inner wall of the rotary kiln furnace, can be suppressed to increase durability. Moreover, the recyclable raw materials can be burned/melted without igniting a burner in the rotary kiln furnace during normal operation other than an intra-furnace heating process (operation preparing process) to reduce the operation cost.

In this case, it is preferable that a ratio of the weight of the additive to the sum of the weight of the recyclable raw materials and the weight of the additive which are charged into the rotary kiln furnace be 0.0035 or higher. With such a configuration, the above-described effects obtained by feeding the additive into the furnace can be more reliably obtained.

In addition, according to another aspect of the present invention, the above-described method of treating recyclable raw materials may further include feeding combustible shredder residue into the rotary kiln furnace, in which a ratio of the weight of the additive to the sum of the weight of the recyclable raw materials, the weight of the shredder residue, and the weight of the additive which are charged into the rotary kiln furnace may be 0.0035 or higher.

In this case, since the ratio of the weight of the additive (the silicate component containing $SiO_2$ as a major component) to the sum (hereinafter, abbreviated as "total introduction amount") of the weight of the recyclable raw materials, the weight of the shredder residue, and the weight of the additive which are charged into the rotary kiln furnace is 0.0035 or higher, the above-described effects obtained by feeding the additive into the furnace can be more reliably obtained.

Specifically, in the present invention, as in the case of the above-described ratio (for example, 0.0035), even if the weight of the additive charged into the furnace is extremely small with respect to the total introduction amount (even if an extremely small amount of additive is charged into the furnace), the additive is not rapidly melted in the entire slag inside the furnace because the additive formed of the silicate component is viscous. Accordingly, an effect of causing the recyclable raw materials to be easily attached on the slag surface is likely to be obtained.

When the above-described ratio is lower than 0.0035, the above-described effect of causing the recyclable raw materials to be easily attached on the slag may not be sufficiently obtained.

In addition, in order to stably maintain the burning state inside the furnace without using a burner during the treatment of the recyclable raw materials, it is preferable that the above-described ratio be 0.5 or lower. As a result, a phenomenon in which the additive is interposed between the recyclable raw materials to suppress the burning (spreading fire) of the recyclable raw materials can be prevented.

In addition, according to still another aspect of the present invention, the above-described method of treating recyclable raw materials may further include feeding at least either the recyclable raw materials or the combustible shredder residue into the rotary kiln furnace, in which the fed recyclable raw materials or the fed combustible shredder residue may be ignited and burned by any one of the recyclable raw materials, the shredder residue, and the slag which are charged into the rotary kiln furnace and burned in advance to maintain a burning/melting state inside the rotary kiln furnace.

In this case, since either the combustible recyclable raw materials or the combustible shredder residue is charged into the furnace, the burning/melting state inside the rotary kiln furnace is stable.

That is, the recyclable raw materials or the shredder residue which is newly charged into the furnace and attached on the slag are reliably ignited and burned by any one of the recyclable raw materials, the shredder residue, and the slag which are charged into the furnace and burned in advance while being attached on the slag. Accordingly, the burning state inside the furnace is stably maintained.

Further, the internal temperature of the furnace can be adjusted to a predetermined range by adjusting at least either a fraction (introduction amount) of the recyclable raw materials or a fraction (introduction amount) of the shredder residue which are charged into the rotary kiln furnace. That is, unlike the related art, it is not necessary that a burner be used to adjust the internal temperature of the furnace, and thus the fuel cost can be significantly reduced.

The shredder residue obtained by crushing waste materials such as waste electrical appliances or discarded automobiles contains a small amount of valuable metals of copper wire and the like. Accordingly, the valuable metals in the shredder residue charged into the rotary kiln furnace are recovered in the subsequent process.

Advantageous Effects of Invention

With the method of treating recyclable raw materials according to the present invention, the recyclable raw materials, which are charged into the rotary kiln furnace, can be stably burned/melted, and thus the treatment efficiency can be stably maintained. In addition, the embrittlement and the wearing of the refractory product, which is used for the inner wall of the rotary kiln furnace, can be suppressed to increase durability. Moreover, the recyclable raw materials can be burned/melted without igniting a burner in the rotary kiln furnace during normal operation other than an intra-furnace heating process (operation preparing process) to reduce the operation cost.

BRIEF DESCRIPTION OF DRAWING

FIG. 1 is a cross-sectional view illustrating equipment for treating recyclable raw materials to describe a method of treating recyclable raw materials according to an embodiment of the present invention.

DESCRIPTION OF EMBODIMENTS

Hereinafter, in order to describe a method of treating recyclable raw materials according to an embodiment of the present invention, recyclable raw material treatment equipment 10 will be described with reference to FIG. 1.

This recyclable raw material treatment equipment 10 is used to recover valuable metals such as copper (Cu), gold (Au), silver (Ag), platinum (Pt), or palladium (Pd) contained in waste materials (hereinafter, abbreviated as "recyclable raw materials") including electronic devices such as electronic substrates, flexible substrates, IC chips, mobile phones, or PCs, electrical appliances such as refrigerators, and automobiles.

As illustrated in FIG. 1, in the recyclable raw material treatment equipment 10, recyclable raw materials W are charged into a rotary kiln furnace 2 and are burned/melted to obtain a slag S, and the slag S discharged from the rotary kiln furnace 2 is granulated to obtain a granulated lump R. Further, in the subsequent process (not illustrated), the granulated lump R is charged into a copper smelting furnace or the like and is smelted to recover the valuable metals.

The recyclable raw material treatment equipment 10 of the embodiment includes a carry-in mechanism 1, the rotary kiln furnace 2, a secondary combustion chamber 3, and a water granulation pit 4.

The carry-in mechanism 1 includes a carry-in portion 12 through which the recyclable raw materials W are carried along a conveyor. Instead of (or together with) using the carry-in portion 12 including the conveyor, a carry-in portion (not illustrated) including a chute which is capable of feeding the recyclable raw materials W into a feeding port 22 of the rotary kiln furnace 2 may be provided.

The rotary kiln furnace 2 includes a cylindrical body portion 21 which horizontally extends. Specifically, the body portion 21 is provided to be gradually inclined downward from a base portion on a upstream side of the slag S to an open end portion 25 on a upstream side thereof in an axis (central axis of the cylinder) direction of the body portion. In addition, the body portion 21 can rotate around the axis of the body portion 21 through plural rolling mechanisms 24.

For an inner wall of the body portion 21, a brick (alumina-chromia brick) having an $Al_2O_3$—$Cr_2O_3$ content of 70% or higher is used as a refractory product. Specifically, a ratio of the sum of the weight of $Al_2O_3$ and the weight of $Cr_2O_3$ to the total weight of the brick (refractory product) is 70% or higher. Examples of components in the brick other than $Al_2O_3$—$Cr_2O_3$ include $ZrO_2$, $SiO_2$, and $ZrSiO_4$.

Specifically, when an example of a composition ratio of the brick of the embodiment is described, the content of $Al_2O_3$—$Cr_2O_3$ is 70%, the content of $ZrO_2$ is about 20%, the content of $SiO_2$ is about 10%, and the balance is $ZrSiO_4$. However, in the brick, components other than $Al_2O_3$—$Cr_2O_3$ and composition ratios thereof are not limited to the above-described example.

In addition, the upper limit of the content of $Al_2O_3$—$Cr_2O_3$ is 100%.

As the refractory product which forms the inner wall of the rotary kiln furnace 2, for example, a caster or a precast block may be used instead of (or together with) the brick.

In the base portion of the rotary kiln furnace 2, the feeding port 22 through which the combustible recyclable raw materials W, the additive (silicate component) A such as silica sand, silica, or casting sand containing $SiO_2$ as a major component, and combustible shredder residue D are charged into the furnace; and a first burner 23 are provided. The open end portion 25 of the rotary kiln furnace 2 is open to the inside of a lower end portion of the secondary combustion chamber 3.

It is preferable that the additive A contain $SiO_2$ in a weight ratio of 50% or higher with respect to the total weight of the additive A. In addition, the shredder residue D contains a combustible material such as plastic or sponge obtained by crushing waste materials such as casings and doors of waste electrical appliances or seats of discarded automobiles.

The first burner 23 is used to heat the inside of the rotary kiln furnace 2 (during the start-up of the inside of the furnace, that is, during operation preparation) and to ignite the recyclable raw materials W and the shredder residue D which are charged into the furnace in the initial stage of the treatment. Basically, the first burner 23 is not used during the normal treatment of the recyclable raw materials W (during normal operation, that is, during continuous operation). That is, an object of the first burner 23 of the embodiment is different from that of a burner for heating the inside of a furnace of the related art in which recyclable raw materials are directly heated during normal operation.

In addition, during normal operation of the rotary kiln furnace 2, combustion air for burning the recyclable raw materials W may be supplied into the furnace using an air-feeding portion 26, such as a blower fan, which is continuously provided to the first burner 23.

The secondary combustion chamber 3 is a pipe which vertically extends. In a lower end portion of the secondary combustion chamber 3, a discharge port 31 of the slag S which is connected to the water granulation pit 4 is provided. In an upper pipe wall of the discharge port 31, an opening 32 which connects the open end portion 25 of the rotary kiln furnace 2 to the inside of the secondary combustion chamber 3 is formed. In addition, in an upper end portion of the secondary combustion chamber 3, a discharge port 33 of combustion gas G is provided and is connected to an exhaust gas post-treatment device (not illustrated) through a duct or the like.

In an intermediate portion of the secondary combustion chamber 3 in the vertical direction, a second burner 34 which burns gas supplied from the rotary kiln furnace 2 into the secondary combustion chamber 3 at a high temperature; and an air supply pipe 35 are provided.

The exhaust gas post-treatment device includes a heat exchanger, a quenching device for preventing resynthesis of dioxins, and a dust/harmful gas removing device, and exhaust gas is finally discharged to the air through these devices.

The water granulation pit 4 includes a water bath 41 in which the slag S discharged from the open end portion 25 of the rotary kiln furnace 2 to the outside of the furnace is cooled and granulated; and a conveyor 42 that carries out the granulated lump R obtained by granulating the slag S.

Next, the method of treating recyclable raw materials using the above-described recyclable raw material treatment equipment 10 will be described.

In order to burn/melt the recyclable raw materials W, first, the body portion 21 of the rotary kiln furnace 2 is rotated, and the first burner 23 is ignited to heat the body portion 21 such that the internal temperature of the body portion 21 is in a predetermined temperature range of, for example, 1200° C. to 1400° C.

Once the internal temperature of the body portion 21 is in a predetermined temperature range suitable for burning/melting the recyclable raw materials W, the recyclable raw materials W are carried to the base portion of the rotary kiln furnace 2 by the carry-in portion 12 and are charged into the body portion 21 through the feeding port 22.

In a rotary kiln method, the shapes of the recyclable raw materials W are not particularly limited. The shapes of the recyclable raw materials W may be powders or integrated products, and the recyclable raw materials W can be melted as long as they have a shape capable of being charged into the furnace.

In melting furnace methods (for example, a gasification melting furnace) other than the rotary kiln method, a pretreatment regarding the shape of recyclable raw materials is necessary, or a pellet shape is preferred. Therefore, an integrated product or a press product is not suitable for the methods.

In addition, along with the feeding of the recyclable raw materials W into the rotary kiln furnace 2, the additive A and the shredder residue D are charged into the furnace. In the example illustrated in the drawing, the additive A and the shredder residue D are charged from the carry-in portion 12 into the rotary kiln furnace 2 through the feeding port 22, along with or separately from the recyclable raw materials W.

However, the embodiment is not limited to this configuration. The additive A and the shredder residue D may be charged into the rotary kiln furnace 2 from another carry-in portion different from the carry-in portion 12 of the recyclable raw materials W.

Further, at least one of the recyclable raw materials W, the additive A, and the shredder residue D may be charged into the furnace through another feeding port other than the feeding port 22 of the rotary kiln furnace 2. It is preferable that positions where the additive A and the shredder residue D are charged into the furnace correspond to positions where the recyclable raw materials W are charged into the furnace.

In the embodiment, the ratio (when the respective weights are expressed using reference numerals of the respective elements, the ratio described herein is "A/(W+D+A)") of the weight of the additive A to the sum of the weight of the recyclable raw materials W, the weight of the shredder residue D, and the weight of the additive A which are charged into the rotary kiln furnace 2 is 0.0035 or higher. In addition, the upper limit of the ratio "A/(W+D+A)" is not particularly limited, but, for example, is preferably 0.5 or lower.

As described above, when the recyclable raw materials w, the shredder residue D, and the additive A are charged into the rotary kiln furnace 2, these elements are ignited by the first burner 23. When the ignition is confirmed, the first burner 23 is extinguished.

It is preferable that combustion air be supplied from the air-feeding portion 26 of the first burner 23 into the rotary kiln furnace 2 even after the first burner 23 is extinguished. However, the embodiment is not limited to this configuration. As means for supplying combustion air into the furnace, a structure (air supply means) other than the air-feeding portion 26 may be used. In addition, such air supply means may be provided in plural at intervals in the axis direction of the body portion 21 of the rotary kiln furnace 2.

By the recyclable raw materials W, the shredder residue D, and the additive A being burned and melted, combustible materials are decomposed to be gasified, and noncombustible materials containing metals are converted into a slag S flowing through the inside of the rotary kiln furnace 2 in the melted state or the semi-melted state.

In this way, the continuous operation (normal operation) of the rotary kiln furnace 2 is started. Next, at least either the recyclable raw materials W or the shredder residue D is continuously charged into the rotary kiln furnace 2 and is ignited and burned by any one of the recyclable raw materials W, the shredder residue D, and the slag S which are charged into the rotary kiln furnace 2 and burned in advance. As a result, the burning/melting state inside the rotary kiln furnace 2 can be maintained without using the first burner 23.

Specifically, it is preferable that the temperature of the rotary kiln furnace 2 be maintained in a predetermined range by adjusting the introduction amount of all the components charged into the rotary kiln furnace 2 (for example, when either the recyclable raw materials W or the shredder residue D is fed, the introduction amount of the single element, or when both the recyclable raw materials W and the shredder residue D are fed, the total introduction amount of both elements). In addition, it is preferable that the additive A be continuously fed the rotary kiln furnace 2 little by little.

"Continuously fed" described in the specification implies being intermittently fed at short intervals. Specifically, "continuously fed" implies that at least either the recyclable raw materials W or the shredder residue D are continuously fed at least once or more per unit time (continuously fed per unit time without interruption) at time intervals at which they can be continuously ignited and burned by burning flames inside the furnace.

At this time, the slag S flowing along the inner wall of the body portion 21 of the rotary kiln furnace 2 contains the melted additive A, and thus the viscosity thereof is increased. As a result, the recyclable raw materials W and the shredder residue D charged into the rotary kiln furnace 2 can be attached on the slag S to be burned/melted in a state where at least a part thereof is exposed to the inside of the furnace.

That is, unlike the related art, all of the recyclable raw materials W and the shredder residue D charged into the furnace are prevented from being wetted by the highly fluid slag S or from being buried in the highly fluid slag S. The recyclable raw materials W and the shredder residue D are reliably ignited and are sufficiently burned/melted by being attached on the slag S in a state where a part thereof is exposed to the inside of the furnace.

The slag S formed in the rotary kiln furnace 2 flows along the inclination of the body portion 21, flows down from the open end portion 25 of the rotary kiln furnace 2 to the inside of the water bath 41 of the water granulation pit 4 to be cooled and granulated, thereby obtaining the granulated lump R. The granulated lump R inside the water bath 41 is carried out by the conveyor 42. In a process subsequent to the process of the recyclable raw material treatment equipment 10, the granulated lump R obtained as above is smelted in a copper smelting furnace or the like to recover valuable metals.

In addition, gas components produced from the recyclable raw materials W or the like in the rotary kiln furnace 2 are burned in the rotary kiln furnace 2 and are supplied from the open end portion 25 of the rotary kiln furnace 2 to the secondary combustion chamber 3. When the gas components are retained in the secondary combustion chamber 3 at a high temperature of 800° C. or higher for 2 seconds or longer, dioxins, for example, are decomposed to be discharged from the discharge port 33 to the subsequent process as the combustion gas G.

In the above-described method of treating recyclable raw materials using the recyclable raw material treatment equipment 10 of the embodiment, the additive A containing $SiO_2$ as a major component is charged into the rotary kiln furnace 2 to increase the viscosity of the slag S flowing along the inner wall of the rotary kiln furnace 2. Accordingly, when the recyclable raw materials W charged into the rotary kiln furnace 2 come into contact with the high-viscosity slag S, the recyclable raw materials are attached on the slag in which at least a part thereof is exposed to the inside of the rotary kiln furnace. As a result, the recyclable raw materials W are reliably brought into contact with combustion air and thus are stably burned and melted.

In addition, the recyclable raw materials W are burned and melted while being attached on the slag S flowing along the inner wall of the furnace. Then, along with rotation of the rotary kiln furnace 2, the recyclable raw materials, for example, spirally flows to a downstream in an axis direction while rotating around the axis of the rotary kiln furnace 2. Therefore, a temperature distribution in the rotary kiln furnace 2 is likely to be uniform.

Accordingly, the treatment efficiency of the recyclable raw materials W can be stably maintained at a high level. In addition, the recyclable raw materials W are likely to be reliably melted. Therefore, unlike the related art, unnecessary processes and cost can be reduced, for example, it is not necessary that a slag S which is discharged outside the furnace in a state containing non-melted residues (solid components) be crushed using a crusher or the like in the subsequent process.

Further, a silicate component used as the additive is used as an auxiliary raw material in the subsequent process, for example, in a smelting process in which the granulated lump R treated in the rotary kiln furnace 2 is charged into a copper smelting furnace to recover valuable metals. Accordingly, when such a subsequent process is provided, a treatment process of removing the silicate component from the granulated lump R is unnecessary.

In addition, in the rotary kiln furnace 2, since the recyclable raw materials W attached on the slag S stably flow while being burned, recyclable raw materials W newly charged into the furnace are easily ignited. As a result, during normal operation (during the treatment of recyclable raw materials W) other than an intra-furnace heating process (operation preparing process), unlike the related art, it is not necessary that a burner be ignited in the rotary kiln furnace. Therefore, burning flames in the furnace can be stably maintained, and the recyclable raw materials W can be continuously burned/melted.

That is, according to the embodiment, a refractory product such as a brick can be prevented from being locally worn by the heating of a burner, and the fuel cost can be reduced.

In addition, for the inner wall of the rotary kiln furnace 2, a refractory product such as an $Al_2O_3$—$Cr_2O_3$-based (alumina-chromia-based) brick is used instead of a basic magnesia-based refractory material. Therefore, the refractory product can be prevented from being embrittled by an effect of moisture in the furnace or the like.

In addition, by controlling the content of $Al_2O_3$—$Cr_2O_3$ to be 70% or higher, resistance to $SiO_2$ can be secured.

In addition, since the hardness is high, the $Al_2O_3$—$Cr_2O_3$-based refractory product is not easily worn even when being rubbed with non-melted solid recyclable raw materials W flowing through the inside of the furnace or with condensates of the slag S, and thus durability is sufficiently secured.

According to the embodiment, with the above-described configurations, the control of properties of the slag S, the adjustment of a burning state in the furnace, and the wear prevention of the refractory product can be realized with simple equipment and method.

That is, the recyclable raw materials W, which are charged into the rotary kiln furnace 2, can be stably burned/melted, and thus the treatment efficiency can be stably maintained. In addition, the embrittlement and the wearing of the refractory product, which is used for the inner wall of the rotary kiln furnace 2, can be suppressed to increase durability. Moreover, the recyclable raw materials W can be burned/melted without igniting a burner in the rotary kiln furnace 2 during normal operation other than an intra-furnace heating process (operation preparing process) to reduce the operation cost.

In addition, in the embodiment, since the ratio "A/(W+D+A)" of the weight of the additive A to the sum (hereinafter, abbreviated as "total introduction amount") of the weight of the recyclable raw materials W, the weight of the shredder residue D, and the weight of the additive A which are charged into the rotary kiln furnace 2 is 0.0035 or higher, the above-described effects obtained by feeding the additive A into the furnace can be more reliably obtained.

Specifically, in the embodiment, as in the case of the above-described ratio (for example, 0.0035), even if the weight of the additive A charged into the furnace is extremely small with respect to the total introduction amount (even if the amount of the additive A is extremely small), the additive A is not rapidly melted in the entire slag S inside the furnace because the additive A formed of the silicate component is viscous. Accordingly, an effect of causing the recyclable raw materials W to be easily attached on the slag S surface is obtained.

When the above-described ratio "A/(W+D+A)" is lower than 0.0035, the above-described effect of causing the recyclable raw materials W to be easily attached on the slag S may not be sufficiently obtained.

In addition, in order to stably maintain the burning state inside the furnace without using the first burner 23 during the treatment of recyclable raw materials W, it is preferable that the above-described ratio "A/(W+D+A)" be 0.5 or lower. As a result, a phenomenon in which the additive A is interposed between the recyclable raw materials W to suppress the burning (spreading fire) of the recyclable raw materials W can be prevented.

In addition, in the embodiment, since either the combustible recyclable raw materials W or the combustible shredder residue D is charged into the furnace, the burning/melting state inside the rotary kiln furnace 2 is stable.

That is, the recyclable raw materials W or the shredder residue D which is newly charged into the furnace and attached on the slag S are reliably ignited and burned by any one of the recyclable raw materials W, the shredder residue D, and the slag S which are charged into the furnace and burned in advance while being attached on the slag S. Accordingly, the burning state inside the furnace is stably maintained.

Further, the internal temperature of the furnace can be adjusted to a predetermined range by adjusting at least one of a fraction (introduction amount) of the recyclable raw materials W and a fraction (introduction amount) of the shredder residue D which are charged into the rotary kiln furnace 2. That is, unlike the related art, it is not necessary that a burner be used to adjust the internal temperature of the furnace, and thus the fuel cost can be significantly reduced.

The shredder residue D obtained by crushing waste materials such as waste electrical appliances or discarded automobiles contains a small amount of valuable metals of copper wire and the like. Accordingly, the valuable metals in the shredder residue D charged into the rotary kiln furnace 2 can be recovered in the subsequent process.

In addition, in the rotary kiln furnace 2 of the embodiment, the feeding port 22 through which the additive A and the shredder residue D are charged into the rotary kiln furnace 2 is the feeding port 22 through which the recyclable raw materials W are charged into the rotary kiln furnace 2. That is, the single feeding port 22 functions as a shared introduction port through which plural materials are charged into the furnace.

Accordingly, the above-described method of treating recyclable raw materials can be performed by using, for example, the existing rotary kiln furnace 2. That is, the additive A containing $SiO_2$ as a major component and the shredder residue D can be fed through the feeding port 22 through which the recyclable raw material W are charged into the rotary kiln furnace 2. Therefore, it is not necessary that a new feeding port through which the additive A and the shredder residue D are charged into the rotary kiln furnace 2 be provided. Accordingly, a structure of the rotary kiln furnace 2 can be simplified, and thus the equipment cost can be reduced.

The present invention is not limited to the above-described embodiment, and various modifications can be made within a range not departing from the scope of the present invention.

For example, in the above-described embodiment, the first burner 23 is extinguished during the continuous operation of the rotary kiln furnace 2. However, for the purposes of the control of the internal temperature of the furnace and the like, the first burner 23 may be intermittently ignited.

In addition, in the above-described embodiment, the example in which the single carry-in portion 12 is provided as the carry-in mechanism 1 of the rotary kiln furnace 2 have been described. However, two or more (plural) carry-in portions may be provided in the furnace. In this case, various types of recyclable raw materials W having shapes and sizes corresponding to the respective carry-in portions may be used.

In addition, when another means for increasing the internal temperature of the rotary kiln furnace 2 (heating means) or another combustion means is secured in the furnace instead of using the first burner 23, the first burner 23 is not necessarily provided.

In addition, within a range not departing from the scope of the present invention, the respective configurations (components) described in the above-described embodiment, the modification example, and the provision may be combined, and additions, omissions, substitutions, and other modifications can be made for the configurations. In addition, the present invention is not limited to the above-described embodiment but only limited to the appended claims.

EXAMPLES

Hereinafter, the present invention will be described in detail using examples. However, the present invention is not limited to these examples.

Using the rotary kiln furnace 2 described in the embodiment, treatment tests A to C were performed under the following conditions.

Specifically, as the rotary kiln furnace 2, a furnace having an inner diameter of 5 m and a length (length in the axis direction) of 14 m was used. In the treatment tests A and B, for the inner wall of the rotary kiln furnace 2, an alumina-chromia brick having an $Al_2O_3$—$Cr_2O_3$ content of 70% or higher was used as a refractory product. Specifically, in the brick (refractory product), the content of the $Al_2O_3$—$Cr_2O_3$ was 70%. As components other than $Al_2O_3$—$Cr_2O_3$, the content of $ZrO_2$ was about 20%, the content of $SiO_2$ was about 10%, and the balance was $ZrSiO_4$.

[Treatment Test A]

The introduction amount of substrates (recyclable raw materials W) containing valuable metals was 100 t per day (100 t/day), and the introduction amount of the shredder residue D and other recyclable raw materials W was 100 t per day (100 t/day). Regarding a case (Comparative Example 1) where the recyclable raw materials W and the shredder residue D were charged into the rotary kiln furnace 2 without using the additive A and cases (Examples 1 and 2) where the recyclable raw materials W and the shredder residue D were charged into the rotary kiln furnace 2 using the additive A, the burning state inside the furnace and the wear rate (brick wear rate per 1 t of the total introduction amount) of the brick (refractory product) inside the furnace were examined.

As the additive A, silica sand having a silicate component ($SiO_2$) in a weight ratio of 90% was used.

As test conditions, the internal temperature of the furnace was 1200° C. to 1400° C., the test period was about 3 months to 6 months with 24-hour continuous operation, and the furnace rotating speed was fixed across the entire test period. In addition, in order to make the internal temperature of the rotary kiln furnace 2 fixed, the temperature of an exit to the secondary combustion chamber 3 (the temperature in the vicinity of the open end portion 25) was maintained in a range of 850° C. to 900° C. as a target temperature. In addition, in order to examine the worn state of the brick (refractory product), the operation of the rotary kiln furnace 2 was stopped, the inside of the furnace was cooled, and the operator entered the inside of the furnace. Specifically, the brick surface was examined by visual inspection. Further a through-hole up to a shell was formed in the brick using a drill, and the depth of the through-hole was measured such that the thickness of the brick (the size of a remained portion after wearing) was examined.

Based on the measured thickness of the brick and the total introduction amount of materials treated during the test period, the wear rate of the brick was calculated. The results are shown in Table 1.

TABLE 1

| [Treatment Test A] | | | |
|---|---|---|---|
| | Ratio of Introduction Amount of Silica Sand to Total Introduction Amount | Burning/Melting State Inside Furnace | Wear rate of Brick |
| Comparative Example 1 | 0 kg/t | Unstable | 0.004 mm/t |
| Example 1 | 5 kg/t (Corresponding to 4.5 kg of Silicate Component) | Stable | 0.001 mm/t |

TABLE 1-continued

| [Treatment Test A] | | | |
|---|---|---|---|
| | Ratio of Introduction Amount of Silica Sand to Total Introduction Amount | Burning/Melting State Inside Furnace | Wear rate of Brick |
| Example 2 | 50 kg/t (Corresponding to 45 kg of Silicate Component) | Stable | 0.001 mm/t |

[Treatment Test B]

Regarding cases (Examples 3 and 4) where the recyclable raw materials W and the shredder residue D were charged into the rotary kiln furnace 2 under the same conditions as those of the treatment test A except that casting sand having a silicate component ($SiO_2$) in a weight ratio of 70% was used as the additive A, the burning/melting state inside the furnace and the wear rate of the brick inside the furnace were examined. The results are shown in Table 2.

TABLE 2

| [Treatment Test B] | | | |
|---|---|---|---|
| | Ratio of Introduction Amount of Casting Sand to Total Introduction Amount | Burning/Melting State Inside Furnace | Wear rate of Brick |
| Example 3 | 5 kg/t (Corresponding to 3.5 kg of Silicate Component) | Stable | 0.001 mm/t |
| Example 4 | 50 kg/t (Corresponding to 35 kg of Silicate Component) | Stable | 0.001 mm/t |

[Evaluation]

The results of the treatment tests A and B were as follows. In all the Examples 1 to 4 in which the silicate component was charged into the furnace, the burning/melting state inside furnace was stably maintained, and non-melted residues or the like were not observed in the slag S discharged outside the furnace.

That is, it was found that, due to its viscousness, the silicate component was not rapidly melted in the entire slag S inside the furnace and had an effect of causing the waste substrates and the like to be attached on the slag S surface and stabilizing the burning state even with a small amount. Specifically, in Example 3, when the ratio of the silicate component to the total introduction amount inside the furnace was at least 0.0035 or higher, the above-described effect was able to be obtained. On the other hand, in Comparative Example 1 in which the silicate component was not charged into the furnace, the burning/melting state inside the furnace was unstable, and non-melted residues were observed in the discharged slag S.

In addition, when Examples 1 to 4 were compared to Comparative Example 1, the wear rate of the brick (refractory product) was significantly suppressed.

[Treatment Test C]

The introduction amount of substrates (recyclable raw materials W) containing valuable metals was 100 t per day (100 t/day), and the introduction amount of the shredder residue D and other recyclable raw materials W was 100 t per day (100 t/day). The recyclable raw materials W and the shredder residue D were charged into the furnace, and the wear rate of the brick (refractory product) was examined.

For the inner wall of the rotary kiln furnace 2 (as the type of the brick which is the refractory product), the following bricks were used. In Comparative Example 2, a brick (magnesia-chromia brick) was used in which, as a major component, the content of MgO—$Cr_2O_3$ was 80%; and as the other components, the content of $Al_2O_3$ was about 10%, the content of $SiO_2$ was about 5%, and the content of $Fe_2O_3$ was about 5%.

In addition, in Comparative Example 3, a brick (alumina-chromia brick) was used in which, as a major component, the content of $Al_2O_3$—$Cr_2O_3$ was 60%; and as the other components, the content of $ZrO_2$ was about 25%, the content of $SiO_2$ was about 15%, and the balance was $ZrSiO_4$.

In addition, in Example 5, a brick (alumina-chromia brick) was used in which, as a major component, the content of $Al_2O_3$—$Cr_2O_3$ was 70%; and as the other components, the content of $ZrO_2$ was about 20%, the content of $SiO_2$ was about 10%, and the balance was $ZrSiO_4$.

In addition, in Comparative Example 3 and Example 5, in addition to the recyclable raw materials W and the shredder residue D, a silicate component was charged into the furnace in an amount corresponding to 100 kg per 1 t of the total introduction amount (corresponding to 100 kg of acid component/1 t of total introduction amount), and the test was performed. The other test conditions, the examination methods after the test, and the like were the same as those of the treatment test A. The results are shown in Table 3.

TABLE 3

| [Treatment Test C] | | |
|---|---|---|
| | Type of Brick | Wear Rate of Brick |
| Comparative Example 2 | MgO—$Cr_2O_3$ Brick (Content: 80%) | 0.008 mm/t |
| Comparative Example 3 | $Al_2O_3$—$Cr_2O_3$ Brick (Content: 60%) | 0.004 mm/t |
| Example 5 | $Al_2O_3$—$Cr_2O_3$ Brick (Content: 70%) | 0.001 mm/t |

[Evaluation]

The results of the treatment test C were as follows. It was found that, when the alumina-chromia brick was used as the refractory product for forming the inner wall of the furnace and when the content of $Al_2O_3$—$Cr_2O_3$ was 70% or higher, the wear rate of the brick (refractor product) was significantly suppressed.

In Comparative Example 2 in which the silicate component was not charged into the furnace, although not particularly shown in Table 3, the burning/melting state inside the furnace was unstable as in the case of the above-described Comparative Example 1. In addition, in Comparative Example 2 in which the brick formed of a basic magnesia-based refractory material was used as the refractory product for forming the inner wall of the furnace, the hardness of the brick was low, the brick was likely to be embrittled, and the viscosity of the slag S was low. Therefore, the brick was likely to be rubbed with solid materials. Under the above-described circumstances and the like, the wear rate of the brick (refractory product) was higher than those of the other examples.

INDUSTRIAL APPLICABILITY

With the method of treating recyclable raw materials according to the present invention, the recyclable raw materials, which are charged into the rotary kiln furnace, can be stably burned, and thus the treatment efficiency can be stably maintained. The embrittlement and the wearing of the refractory product, which is used for the inner wall of the rotary kiln furnace, can be suppressed to increase durability. Moreover, the recyclable raw materials can be burned without igniting a burner in the rotary kiln furnace during normal operation to reduce the operation cost. Based on the above-described effects, the present invention is industrially applicable.

REFERENCE SIGNS LIST

2 ROTARY KILN FURNACE
A ADDITIVE
D SHREDDER RESIDUE
S SLAG
W RECYCLABLE RAW MATERIALS

The invention claimed is:

1. A method of treating recyclable raw materials containing valuable metals, the method comprising the steps of:
   feeding recyclable raw materials containing valuable metals into a rotary kiln furnace in which a refractory product having an $Al_2O_3$—$Cr_2O_3$ content of 70% or greater is used for an inner wall;
   feeding combustible shredder residue into the rotary kiln furnace,
   feeding an additive containing $SiO_2$ as a major component into the rotary kiln furnace so as to increase a viscosity of a slag flowing along the inner wall, thereby the recyclable raw materials are attached on the slag having a high viscosity such that at least part of the recyclable raw materials is exposed to the inside of the rotary kiln furnace; and
   burning/melting the recyclable raw materials attached on the slag in the rotary kiln furnace wherein a ratio of the weight of the additive to the sum of the weight of the recyclable raw materials, the weight of the shredder residue, and the weight of the additive which are charged into the rotary kiln furnace is 0.0035 or higher and 0.5 or lower.

2. The method of treating recyclable raw materials according to claim 1, further comprising
   feeding at least either the recyclable raw materials or the combustible shredder residue into the rotary kiln furnace,
   wherein the fed recyclable raw materials or the fed combustible shredder residue is ignited and burned by any one of the recyclable raw materials, the shredder residue, and the slag which are charged into the rotary kiln furnace and burned in advance to maintain a burning/melting state inside the rotary kiln furnace.

* * * * *